United States Patent [19]

Kassai

[11] Patent Number: 4,626,030
[45] Date of Patent: Dec. 2, 1986

[54] BABY CARRIAGE

[75] Inventor: Kenzou Kassai, Osaka, Japan

[73] Assignee: Aprica Kassai Kabushikikaisha, Osaka, Japan

[21] Appl. No.: 766,897

[22] Filed: Aug. 16, 1985

[30] Foreign Application Priority Data

Sep. 10, 1984 [JP] Japan .............................. 59-137744[U]

[51] Int. Cl.⁴ ................................................ A47C 7/50
[52] U.S. Cl. .............................. 297/429; 297/DIG. 4; 297/437
[58] Field of Search ............... 297/429, 428, 437, 431, 297/423, DIG. 4; 248/412

[56] References Cited

U.S. PATENT DOCUMENTS

| 2,244,096 | 6/1941 | Brazell | 297/DIG. 4 |
| 2,470,258 | 5/1949 | Mustafa | 297/429 X |
| 2,851,086 | 9/1958 | Weiner | 297/437 X |
| 2,935,123 | 5/1960 | Lloyd-Young | 297/437 X |
| 4,229,039 | 10/1980 | Day | 297/437 |
| 4,534,594 | 8/1985 | Lucien | 297/438 |

FOREIGN PATENT DOCUMENTS 97234 12/1922 Switzerland ........................ 297/428

Primary Examiner—James T. McCall
Attorney, Agent, or Firm—W. G. Fasse; D. H. Kane, Jr.

[57] ABSTRACT

A baby carriage has a footrest which extends between and is attached to a pair of front legs. The footrest has first and second foot support surfaces which are adapted to selectively appear in the foot support position.

3 Claims, 13 Drawing Figures

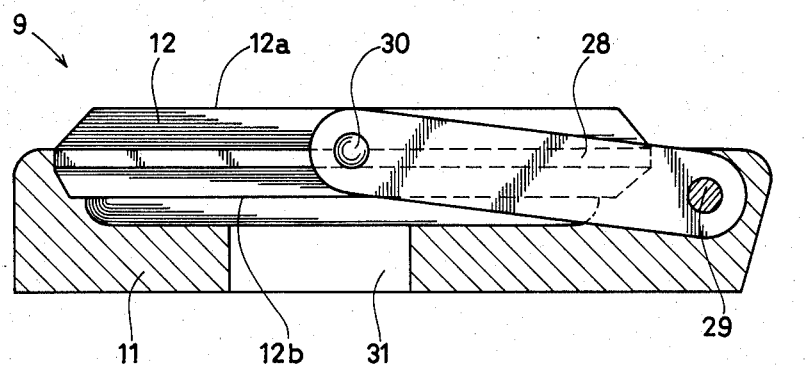
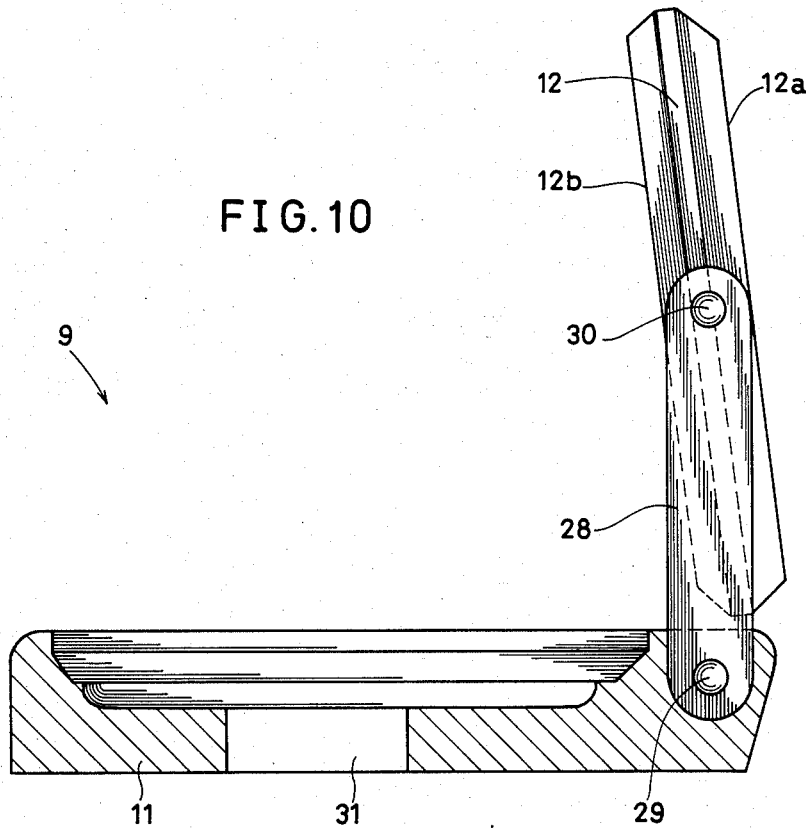

BABY CARRIAGE

BACKGROUND OF THE INVENTION

1. Field of the Invention

This invention relates to a baby carriage and more particularly it relates to a baby carriage having a footrest extending between and attached to a pair of front legs having front wheels.

2. Description of the Prior Art

Said footrest has a foot support surface for supporting the feet of an infant placed on the seat of the baby carriage. A conventional baby carriage has only one such foot support surface. As a result, the same foot support surface appears in the foot support position.

Thus, a problem arises. For example, suppose that a toddler is seated in a baby carriage. This infant may be seated with shoes on in one case and with shoes off in another case. Therefore, the foot support surface of the footrest will be in direct contact with shoes in one case and with feet in another case. Suppose that the infant was seated in a baby carriage with its shoes on and later its shoes were taken off. In this case, if the shoes had mud or the like sticking to their soles, the foot support surface of the footrest would be soiled. As a result, if the bare feet were placed on the foot support surface of the footrest, the mud or the like would stick to the feet, a fact which is undesirable from a hygienic point of view. If it is desired to ensure that no mud or the like sticks to the feet, the foot support surface of the footrest soiled with mud or the like must be cleaned before the feet are placed thereon, but this cleaning is troublesome.

SUMMARY OF THE INVENTION

This invention, intended to eliminate the aforesaid inconvenience, is a baby carriage having first and second foot support surfaces. The first and second foot support surfaces are adapted to selectively appear in the foot supporting position.

Thus, if an infant is wearing shoes, the first foot support surface may be used, while if the infant is not wearing shoes, the second foot support surface may be used. In this way, it is possible to prevent the feet of the infant from being soiled with mud or the like.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagrammatic side view of the principal portions of another embodiment of the invention;

FIG. 10 is a view showing the state reached after a connecting member has risen from the state shown in FIG. 9;

DESCRIPTION OF THE PREFERRED EMBODIMENTS

Figure 1:
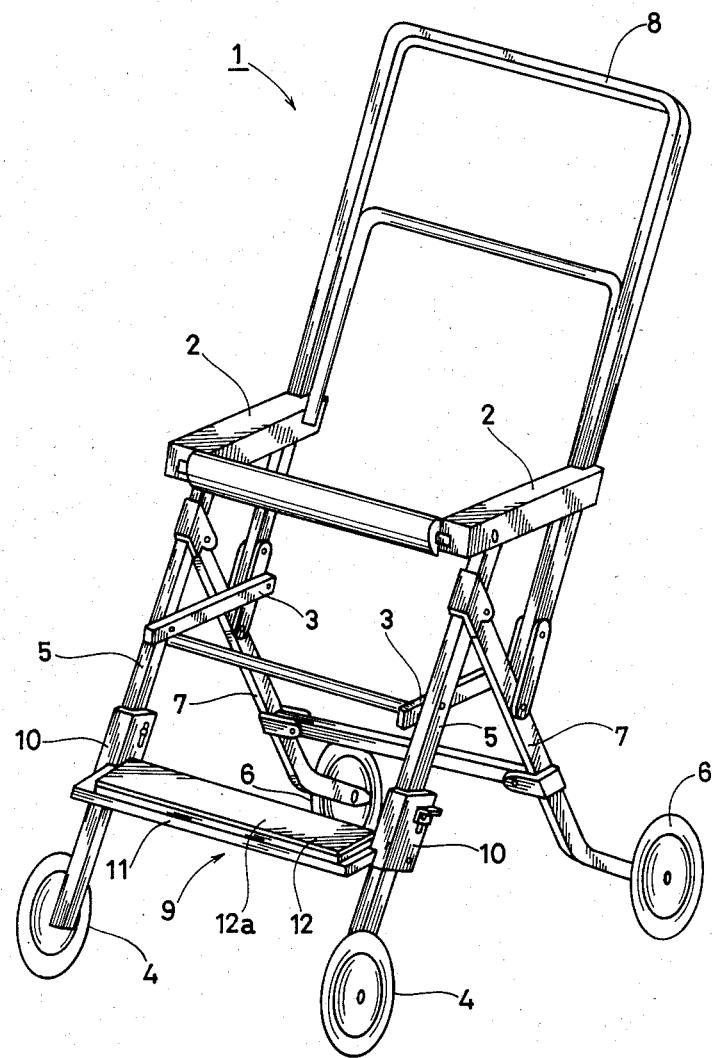
FIG. 1 is a perspective view showing an embodiment of the invention.

Referring to FIG. 1, a baby carriage 1 comprises a pair of longitudinally extending handrails 2, seat support rods 3 for supporting a seat, a pair of front legs 5 attached at their upper ends to the handrails 2 and having at their lower ends front wheels 4, a pair of rear legs 7 attached at their upper ends to the front legs 5 and having at their lower ends rear wheels 6, and a U-shaped push rod 8. A footrest 9 extends between and is attached to the front legs 5.

The footrest 9 comprises a pair of sleeves 10 surrounding the front legs 5, a lower plate 11 fixedly attached between the sleeves 10, and an upper plate 12 placed on said lower plate.

Figure 2:
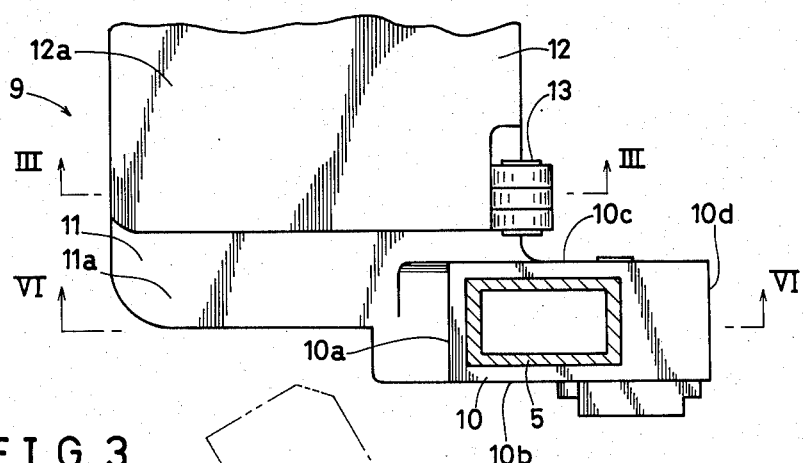
FIG. 2 is a plan view of the left-hand portion of a footrest shown in FIG. 1.
Figure 3:
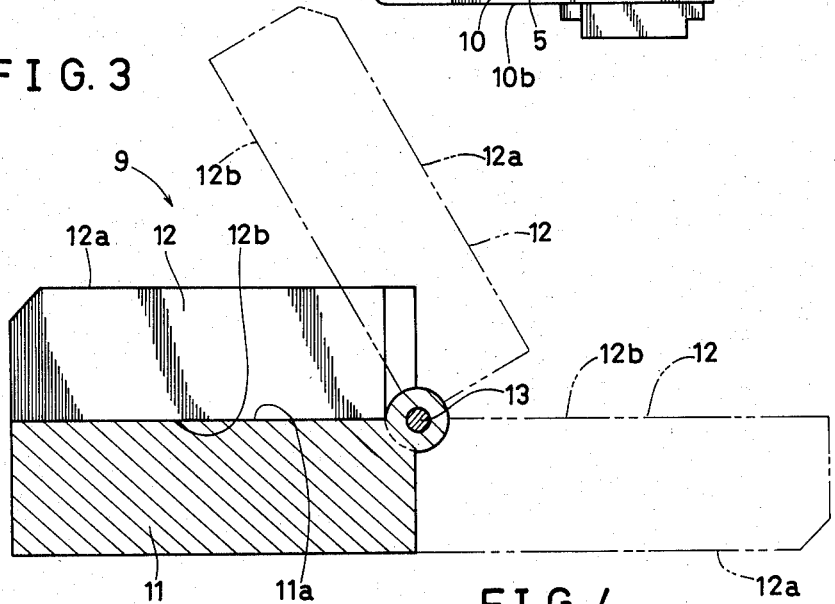
FIG. 3 is a sectional view taken along the line III—III in FIG. 2.

Referring to FIGS. 1, 2 and 3 the upper and lower plates 12 and 11 of the footrest 9 are hinged together at their rear ends by a pin 13. Therefore, the upper plate 12 can be rearwardly turned as shown in phantom lines in FIG. 3. The terminal end of the turning movement of the upper plate 12 is defined by the rear end surface of the upper plate 12 abutting against the rear end surface of the lower plate 11.

Figure 4:
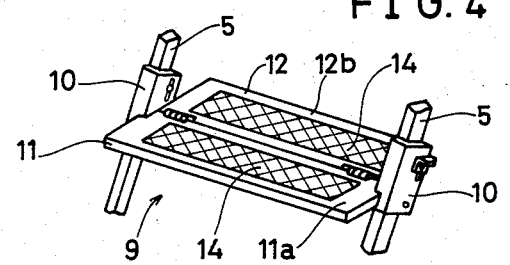
FIG. 4 is a perspective view showing the state reached after the upper plate of the footrest has been turned rearwardly from the state shown in FIG. 1.

FIG. 4 shows the state reached after the upper plate 12 has been turned rearwardly. In the state shown in FIG. 1, the upper surface 12a of the upper plate 12 appears in the position for supporting an infant's feet. In the state shown in FIG. 4, the upper surface 11a of the lower plate 11 appears in the position for supporting an infant's feet. Thus, when the infant is wearing shoes, for example, the upper surface 12a of the upper plate 12 may be used as the foot support surface as shown in FIG. 1, while when the infant is not wearing shoes, the upper surface 11a of the lower plate 11 may be used as the foot support surface as shown in FIG. 4. In addition, when the upper plate 12 has been opened as shown in FIG. 4, the lower surface 12b of the upper plate 12 together with the upper surface 11a of the lower plate 11 may be used as the foot support surface. Considering that bare feet will be placed on the upper surface 11a of the lower plate 11 and the lower surface 12b of the upper plate 12, it would be desirable that a soft fabric 14 be laid on these surfaces.

In the preferred embodiment, the footrest 9 is arranged so that its level can be adjusted as needed. Thus when a baby or infant with a small body is to be set on the seat, the level of the footrest can be raised, while when an infant with a big body is to be set on the seat, the level of the footrest can be lowered. Various constructions for adjusting the level of the footrest can be used, and one example will be described.

The footrest 9 has a pair of sleeves 10 on opposite sides to surround the front legs 5, as described above. A mechanism for adjusting the level of the footrest 9 is provided in association with said sleeve 10 and said front legs 5. Such footrest level adjusting mechanisms are provided on both right and left sides, but since they are substantially the same, only the footrest level adjusting mechanism provided on the left side will be taken up for description.

Figure 5:
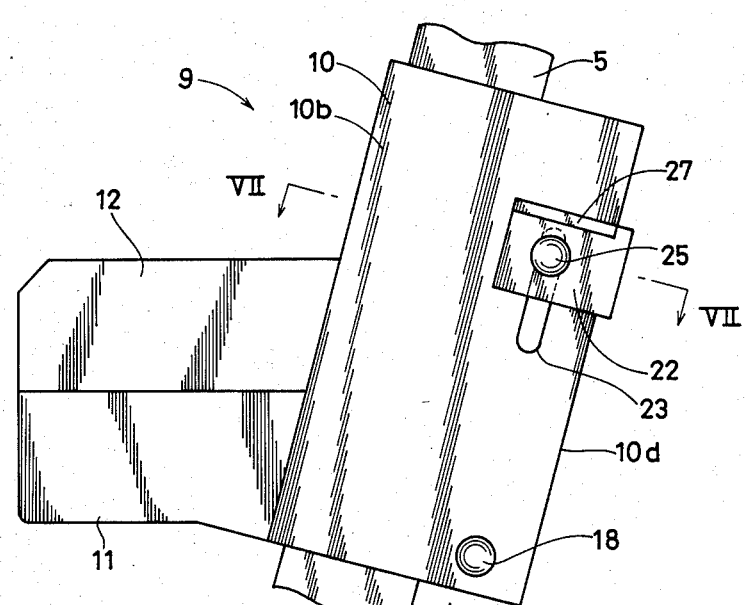
FIG. 5 is an enlarged side view of a portion of a sleeve for mounting the footrest to a front leg.

FIGS. 2 and 5 show on an enlarged scale a portion where the sleeve 10 of the footrest 9 overlaps the front leg 5. As is clear from e.g. FIGS. 6 and 7, the sleeve 10 is shaped to surround the front leg 5. Thus, the sleeve 10, is capable of sliding along and on the front leg 5, whereby the entire footrest 9 can be moved up or down when a locking mechanism is released.

Figure 6:
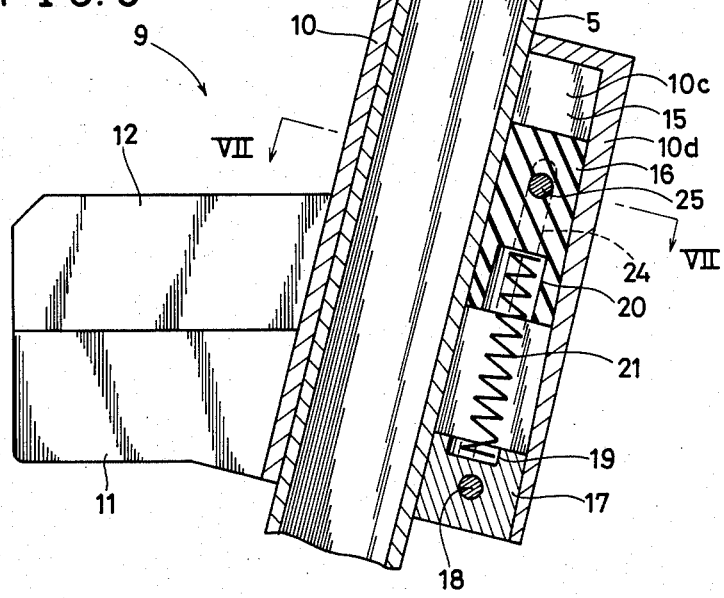
FIG. 6 is a sectional view taken along the line VI—VI in FIG. 2.

The sleeve 10 comprises a front wall 10a, a left-hand side wall 10b, a right-hand side wall 10c, and a rear wall 10d. As best shown in FIG. 6, a clearance 15 is defined between the rear wall 10d of the sleeve 10 and the outer surface of the front leg 5. Thus, the rear wall 10d forms a wall remote from the front leg 5, i.e., a remote wall. The shape of the inner wall surface of the remote wall forming th rear wall 10d is such that the distance between it and the outer surface of the front leg 5 is gradually narrowed toward the top. In the illustrated embodiment, it is tapered to form the locking mechanism.

Figure 7:
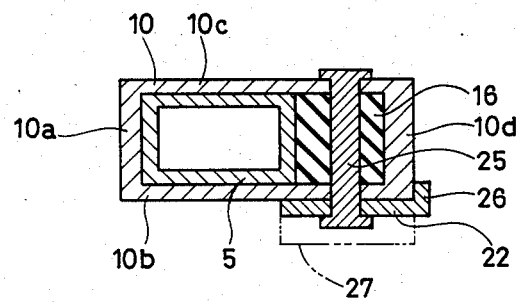
FIG. 7 is an end view taken along the line VII—VII in FIG. 6.

Referring to FIGS. 6 and 7, disposed in the clearance 15 defined between the inner wall surface of the rear wall 10d of the sleeve 10 and the outer surface of the front leg 5 is a stopper 16 which is vertically movable in said clearance. When the stopper 16 is in the limit position of its upward movement in the clearance, i.e., in the position shown in FIG. 6, it is pressed against the inner wall surface of the rear wall 10d of the sleeve 10 and against the outer surface of the leg 5 opposed thereto. Therefore, large amounts of frictional force are produced between the stopper 16 and the front leg 5 and between the stopper 16 and the rear wall 10d of the sleeve 10, with the result that the slide movement of the sleeve 10 relative to the front leg 5 is inhibited. In addition, in order to increase said frictional forces, the stopper 16 is preferably made of rubber or the like.

As shown in FIG. 6, a spring seat member 17 is disposed in the lower region of the clearance 15. The spring seat member 17 is fixed to the sleeve 10 by fixing pin 18 extending through left-hand and right-hand side walls 10b and 10c of the sleeve 10. The upper surface of the spring seat member 17 and the bottom surface of the stopper 16 are formed with spring receiving holes 19 and 20, respectively. A spring 21 is installed so that it is positioned in these spring receiving holes 19 and 20. The spring 21 constantly urges the stopper 16 to move upwardly. Thus, by the action of the spring 21, the stopper 16 is brought to the uppermost position to which it is allowed to move, thereby inhibiting the slide movement of the sleeve 10, as described above.

Disposed on the left-hand side wall 10b of the sleeve 10 is an operating member 22 for moving the stopper 16 downward. The operating member 22 is connected to the stopper 16 in the following manner. The left-hand and right-hand side walls 10b and 10c of the sleeve 10 are formed with elongated holes 23 and 24, respectively, extending lengthwise of the front leg 5. A pin 25 is installed which extends successively through the elongated hole 23, the stopper 16 and the elongated hole 24. One end of the pin 25 projects beyond the left-hand side wall 10b of the sleeve 10, with the operating member 22 fixedly attached to the projecting portion. Thus, the stopper 16 and the operating member 22 can be moved as a unit with the aid of the pin 25. The elongated holes 23 and 24 allow such movement. Referring to FIGS. 5 and 7, the operating member 22 has a hem portion 26 extending along the outer surface of the rear wall 10d of the sleeve 10, and a handle portion 27 projecting to the left-hand side, or toward the reader as viewed in FIG. 5. The hem portion 26 serves to properly guide the operating member 22, while the handle portion 27 serves to make it easier for the person who operates the operating member 22 to move the operating member 22 by hand.

Figure 8:
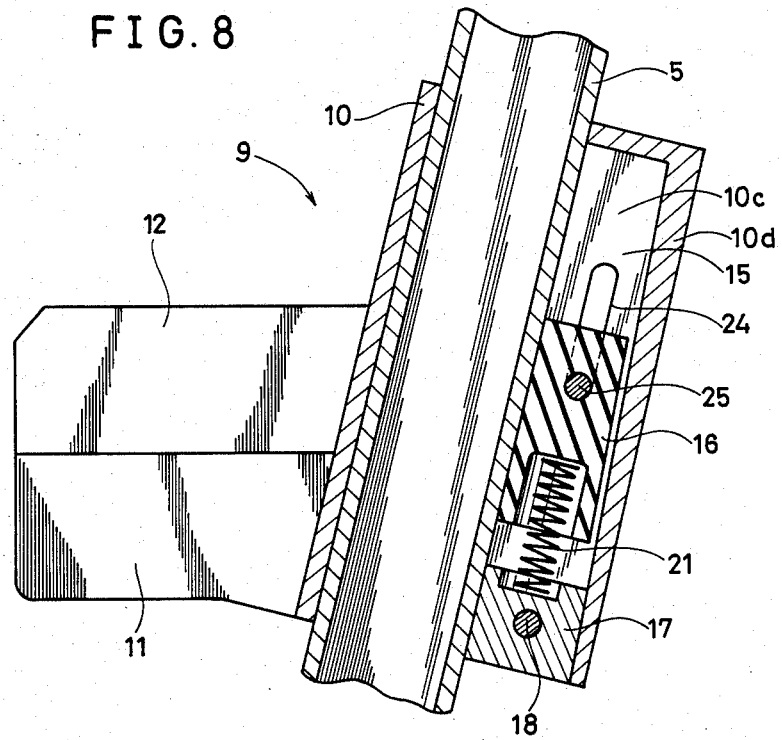
FIG. 8 is a view showing the state reached after a stopper has moved downwardly from the state shown in FIG. 6.

Suppose that it is necessary to change the level of the footrest 9. In this case, first, the operating member 22 is moved downward against the force of the spring 21. Then, the stopper 16 is also moved downward. This state is shown in FIG. 8. As is clear from this figure, since the inner wall surface of the rear wall 10d of the sleeve 10 is shaped so that the distance between it and the outer surface of the front leg 5 is gradually widened toward the bottom, the downward movement of the stopper 16 results in a clearance being formed between the stopper 16 and the inner wall surface of the rear wall 10d. Consequently, the frictional force between the stopper 16 and the rear wall 10d of the sleeve 10d disappears, and the frictional force between the stopper 16 and the front leg 5 is decreased to a minimum. As a result, the sleeve 10, i.e., the footrest 9 is allowed to slide on the front leg 5. In this way, the footrest 9 is moved to a desired position, and the operator loses her grip on the operating member 22, whereupon the stopper 16 is moved to the uppermost position by the action of the spring 21. This is the state shown in FIG. 6. In this state, the slide movement of the footrest 9 is inhibited by the frictional forces between the stopper 16 and the front leg 5 and between the stopper 16 and the rear wall 10d of the sleeve 10. In this way, the footrest is fixed at a desired level.

The embodiment shown in FIGS. 1 to 8 is simply one example of the invention. Therefore, various changes or modifications are possible. Some changes are described below.

The footrest 9 shown in FIG. 1 is noted. In the figure, the lower and upper plates 11 and 12 are positioned in the lowermost region of the sleeve 10. However, the lower and upper plates 11 and 12 may be positioned in the uppermost region of the sleeve 10. With such an arrangement, when the footrest 9 has been moved to the uppermost position to which it is allowed to move, the lower and upper plates 11 and 12 can be used as an extension of the seat.

FIGS. 9 and 10 are diagrammatic views of the principal portions of another embodiment of this invention. In this embodiment, the footrest 9 comprises upper and lower plates 12 and 11 which are superposed on each other, and an connecting member 28 connecting said upper and lower plates 12 and 11 to each other. The connecting member 28 is rotatably attached at one end thereof to the rear side of the lower plate 11 by a pin 29 and at the other end to the lateral middle portion of the upper plate 12. The upper surface 12a of the upper plate 12 forms a first foot support surface and the lower surface 12b thereof forms a second foot support surface. In the state shown in FIG. 9, the upper surface 12a of the upper plate 12 appears in the foot supporting position.

When it is desired to change this state so that the lower surface 12b of the upper plate forming the foot support surface appears in the foot supporting position, the connecting member 28 is raised, as shown in FIG. 10. To facilitate this operation, the lower plate 11 preferably has a throughgoing hole 31. Thus, the operator will first insert a hand into the throughgoing hole 31 from below to lift the upper plate 12. Then, the state shown in FIG. 10 can be easily established. From the state shown in FIG. 10, the upper plate 12 is turned until its lower surface 12b faces up. The connecting member 28 is then lowered to put the upper plate 12 on the lower plate 11; thus, the lower surface 12b of the upper plate 12 appears in the foot support position.

Figure 11:
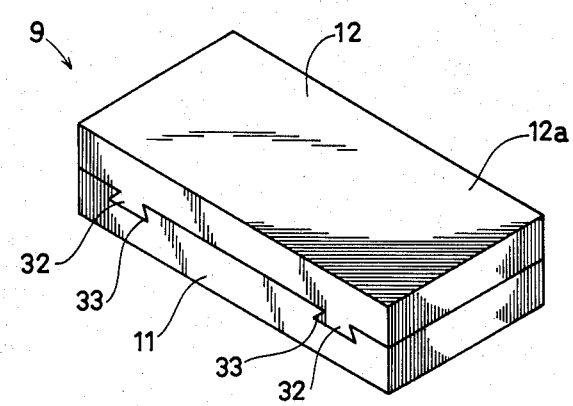
FIG. 11 is a diagrammatic perspective view showing the principal portions of still another embodiment of the invention.
Figure 12:
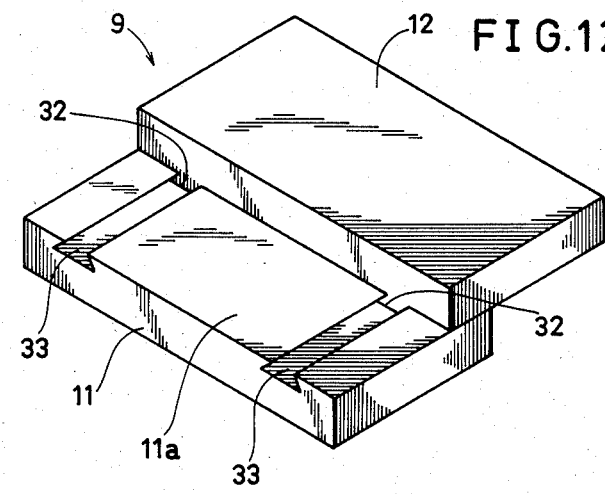
FIG. 12 is a view showing the state reached after an upper plate has been slid rearwardly from the state shown in FIG. 11.

FIGS. 11 and 12 show the principal portions of another embodiment of the invention. In this embodiment, the footrest 9, as in the preceding embodiment, comprises an upper plate 12 and a lower plate 11 which are superposed on each other. The difference between the preceding embodiment and the embodiment of figure is that the upper plate 12 is slidable on the lower plate 11. That is, the bottom surface of the upper plate 12 has dovetails 32, while the upper surface 11a of the lower plate 11 has dovetail grooves 33 adapted to receive said dovetails 32. The upper surface 12a of the upper plate 12 forms a first foot supporting surface, while the upper surface 11a of the lower plate 11 forms a second foot supporting surface. In the state shown in FIG. 11, the upper surface 12a of the upper plate 12 appears in the foot supporting position. If the upper plate 12 is rearwardly slid, as shown in FIG. 12, the upper surface 11a of the lower plate 11 appears in the foot supporting position.

Figure 13:
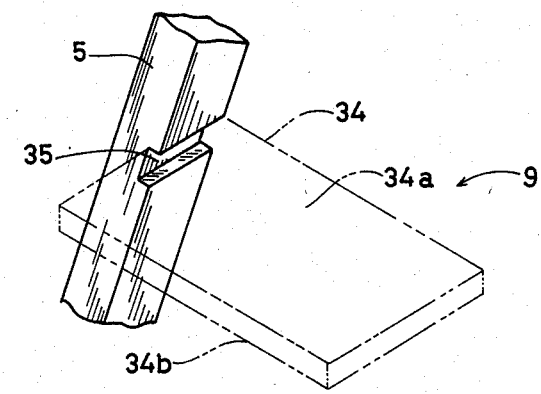
FIG. 13 is a diagrammatic perspective view showing the principal portions of still another embodiment of the invention.

FIG. 13 shows the principal portions of a further embodiment. In this embodiment, the footrest 9 has a single foot support plate 34 with an upper surface 34a forming a first foot supporting surface and with a lower surface 34b forming foot a second supporting surface. The foot supporting plate 34 is removably installed between the pair of front legs 5. More particularly, each front leg 5 has a fitting groove 35 for removably receiving a side edge of the foot support plate 34. In FIG. 13, the upper surface 34a of the foot support plate 34 appears in the foot support position. When it is desired to bring the lower surface 34b of the foot support plate 34 to the foot support position, first the foot support plate 34 is forwardly pulled until it is removed from the fitting groove 35. Next, the foot support plate 34 is turned over and is fitted again in the fitting groove 35, with the result that the lower surface 34b of the foot support plate 34 appears in the foot support position.

In the embodiment shown in FIGS. 1 to 8, the level of the footrest 9 has been adjustable. However, the baby carriage may be one in which such adjustment is impossible. For example, in the case of FIG. 1, the footrest 9 may not have a pair of sleeves 10 and instead the lower plate 11 may be fixedly connected to the pair of front legs 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage, comprising leg means including a pair of front legs with front wheels attached to said legs, a footrest extending between and being attached to said pair of front legs, said footrest comprising first and second foot supporting surfaces adapted for selectively appearing in a foot supporting position, said first and second foot supporting surfaces comprising an upper plate and a lower plate superposed on each other, and two connecting members for connecting said upper and lower plates to each other, first journal means tiltably securing one end of said connecting members to a side of said lower plate and second journal means tiltably securing the other end of said connecting members to a lateral middle portion of said upper plate, whereby an upper surface of said lower plate forms said first foot supporting surface, and wherein a surface of said upper plate forms said second foot support surface.

2. A baby carriage, comprising leg means including a pair of front legs with front wheels attached to said legs, a footrest extending between and being attached to said pair of front legs, said footrest comprising first and second foot supporting surfaces adapted for selectively appearing in a foot supporting position, said footrest comprising an upper plate and a lower plate which are superposed on each other, means slidably connecting said upper plate to said lower plate so that said upper and lower plates extend with their foot supporting surfaces at least partially in parallel to each other even when one plate is in an extended position, said upper surface of said upper plate forming said first foot supporting surface and said upper surface of said lower plate forming said second foot supporting surface.

3. A baby carriage, comprising leg means including a pair of front legs with front wheels attached to said front legs, a footrest extending between said pair of front legs, said footrest comprising a single plate (34) having a first surface (34a) and a second surface (34b), said front legs having a pair of inwardly facing grooves opposite each other for removably holding said footrest plate in place between said front legs, said footrest plate having lateral edges fitting with a holding fit into said grooves, whereby said plate is insertable into said grooves selectively so that either said first or said second plate surface faces upwardly.

* * * * *